(12) United States Patent
Smith et al.

(10) Patent No.: US 7,123,192 B2
(45) Date of Patent: Oct. 17, 2006

(54) CORRELATION OF FLIGHT TRACK DATA WITH OTHER DATA SOURCES

(75) Inventors: Alexander E. Smith, McLean, VA (US); Bennett Cohen, Alexandria, VA (US)

(73) Assignee: Rannoch Corporation, Alexandria, VA (US)

( * ) Notice: Subject to any disclaimer, the term of this patent is extended or adjusted under 35 U.S.C. 154(b) by 175 days.

(21) Appl. No.: 10/830,444

(22) Filed: Apr. 23, 2004

(65) Prior Publication Data

US 2005/0007272 A1    Jan. 13, 2005

Related U.S. Application Data

(60) Division of application No. 10/457,439, filed on Jun. 10, 2003, now Pat. No. 6,885,340, which is a continuation-in-part of application No. 09/516,215, filed on Feb. 29, 2000, now Pat. No. 6,633,259, application No. 10/830,444, which is a continuation-in-part of application No. 10/319,725, filed on Dec. 16, 2002, now Pat. No. 6,812,890.

(60) Provisional application No. 60/440,618, filed on Jan. 17, 2003.

(51) Int. Cl.
*G01S 3/02* (2006.01)

(52) U.S. Cl. ........................ 342/455; 342/456
(58) Field of Classification Search .................. 342/32, 342/37, 455, 456, 457; 701/117, 120, 121
See application file for complete search history.

(56) References Cited

U.S. PATENT DOCUMENTS

| 3,668,403 A | 6/1972 | Meilander ............... 235/150.23 |
| 3,705,404 A | 12/1972 | Chisholm ............... 343/112 R |
| 4,167,006 A | 9/1979 | Funatsu et al. ........ 343/6.5 LC |
| 4,196,474 A | 4/1980 | Buchanan et al. .......... 364/461 |
| 4,229,737 A | 10/1980 | Heldwein et al. ........... 343/6 R |
| 4,359,733 A | 11/1982 | O'Neill ....................... 342/36 |
| 4,454,510 A | 6/1984 | Crow ......................... 343/5 |
| 4,524,931 A | 6/1985 | Nilsson ....................... 246/167 |
| 4,688,046 A | 8/1987 | Schwab ...................... 342/456 |

(Continued)

FOREIGN PATENT DOCUMENTS

| JP | 9-288175 A | 11/1994 |
| JP | 6-342061 A | 12/1994 |
| JP | 8-146130 A | 5/1996 |
| JP | 9-119983 A | 11/1996 |

OTHER PUBLICATIONS

Traffic Alert System Technical Design Summary, Final Report, Apr. 1994 (Baldwin et al.).
AIRSCENE, The Complete Air Traffic Picture in Real Time, www.airscene.com, Rannoch Corporation, Alexandria, Virginia, undated.

(Continued)

*Primary Examiner*—Dao Phan
(74) *Attorney, Agent, or Firm*—Robert Platt Bell

(57) ABSTRACT

The surveillance system provides a means to augment Automatic Dependent Surveillance-Broadcast (ADS-B) with "look alike ADS-B" or "pseudo ADS-B" surveillance transmissions for aircraft which may not be ADS-B equipped. The system uses ground based surveillance to determine the position of aircraft not equipped with ADS-B, then broadcasts the identification/positional information over the ADS-B data link. ADS-B equipped aircraft broadcast their own position over the ADS-B data link. The system enables aircraft equipped with ADS-B and Cockpit Display of Traffic Information (CDTI) to obtain surveillance information on all aircraft whether or not the proximate aircraft are equipped with ADS-B.

6 Claims, 9 Drawing Sheets

U.S. PATENT DOCUMENTS

| | | | |
|---|---|---|---|
| 4,782,450 A | 11/1988 | Flax | 364/461 |
| 4,914,733 A | 4/1990 | Gralnick | 340/961 |
| 5,075,694 A | 12/1991 | Donnangelo et al. | 342/455 |
| 5,144,315 A | 9/1992 | Schwab et al. | 342/49 |
| 5,153,836 A | 10/1992 | Fraughton et al. | 364/461 |
| 5,191,342 A | 3/1993 | Alsup et al. | 342/465 |
| 5,262,784 A | 11/1993 | Drobnicki et al. | 342/45 |
| 5,268,698 A | 12/1993 | Smith, Sr. et al. | 342/450 |
| 5,365,516 A | 11/1994 | Jandrell | 370/18 |
| 5,374,932 A | 12/1994 | Wyschogrod et al. | 342/36 |
| 5,381,140 A | 1/1995 | Kuroda et al. | 340/961 |
| 5,402,116 A | 3/1995 | Ashley | 340/870.1 |
| 5,454,720 A | 10/1995 | FitzGerald et al. | 434/27 |
| 5,528,244 A | 6/1996 | Schwab | 342/37 |
| 5,570,095 A | 10/1996 | Drouilhet, Jr. et al. | 342/357 |
| 5,596,326 A | 1/1997 | Fitts | 342/30 |
| 5,596,332 A | 1/1997 | Coles et al. | 342/455 |
| 5,627,546 A | 5/1997 | Crow | 342/352 |
| 5,629,691 A | 5/1997 | Jain | 340/961 |
| 5,680,140 A | 10/1997 | Loomis | 342/357 |
| 5,714,948 A | 2/1998 | Farmakis et al. | 340/961 |
| 5,752,216 A | 5/1998 | Carlson et al. | 701/117 |
| 5,774,829 A | 6/1998 | Cisneros et al. | 701/213 |
| 5,781,150 A | 7/1998 | Norris | 342/357 |
| 5,867,804 A | 2/1999 | Pilley et al. | 701/120 |
| 5,999,116 A | 12/1999 | Evers | 342/36 |
| 6,049,304 A | 4/2000 | Rudel et al. | 342/357.08 |
| 6,085,150 A | 7/2000 | Henry et al. | 701/301 |
| 6,094,169 A | 7/2000 | Smith et al. | 342/465 |
| 6,133,867 A | 10/2000 | Eberwine et al. | 342/29 |
| 6,211,811 B1 | 4/2001 | Evers | 342/36 |
| 6,219,592 B1 | 4/2001 | Muller et al. | 701/9 |
| 6,292,721 B1 | 9/2001 | Conner et al. | 701/9 |
| 6,314,363 B1 | 11/2001 | Pilley et al. | 701/120 |
| 6,347,263 B1 | 2/2002 | Johnson et al. | 701/14 |
| 6,380,870 B1 | 4/2002 | Conner et al. | 340/970 |
| 6,384,783 B1 | 5/2002 | Smith et al. | 342/387 |
| 6,445,310 B1 | 9/2002 | Bateman et al. | 340/970 |
| 6,448,929 B1 | 9/2002 | Smith et al. | 342/456 |
| 6,463,383 B1 * | 10/2002 | Baiada et al. | 701/120 |
| 6,469,664 B1 | 10/2002 | Michaelson et al. | 342/357.13 |
| 6,477,449 B1 | 11/2002 | Conner et al. | 701/4 |
| 6,571,155 B1 | 5/2003 | Carriker et al. | 701/3 |
| 6,606,034 B1 | 8/2003 | Muller et al. | 340/970 |
| 6,789,011 B1 * | 9/2004 | Baiada et al. | 701/120 |
| 6,792,340 B1 | 9/2004 | Dunsky et al. | 701/4 |
| 6,873,903 B1 * | 3/2005 | Baiada et al. | 701/120 |
| 2004/0225432 A1 * | 11/2004 | Pilley et al. | 701/117 |

OTHER PUBLICATIONS

GPS Relative Accuracy for Collision Avoidance, Institute of Navigation Technical Meeting, Jan. 1997 (Rudel et al.).

Cassell, R., Smith A., Cohen, B., Yang, E., Sleep, B., A Prototype Aircraft Performance Risk Assessment Model, Final Report, Rannoch Corporation, Feb. 28, 2002.

Cassell, R., Smith A., Cohen, B., Yang, E., Sleep, B., Esche, J., Aircraft Performance Risk Assessment Model (APRAM), Rannoch Corporation, Nov. 30, 2002.

Cox, E., A., Fuzzy Logic For Business and Industry, Charles River Media, 1995, Chapter 5.

Smith, A., Cassell, R., Cohen, B., An approach to Aircraft Performance Risk Assessment Modeling, Final Report, Rannoch Corporation, Mar. 1999.

M.L. Wood and R. W. Bush, "Multilateration on Mode S and ATCRBS Signals at Atlanta's Hartsfield Airport", Lincoln Laboratory, M.I.T., Jan. 8, 1998.

AERMOD: Description of Model Formulation (Version 02222) EPA 454/R–02–002d, Oct. 21, 2002.

FAA Integrated Noise Model, www.faa.gov, current release INM 6.1 (Mar. 4, 2003).

"Flight Explorer News: Flight Explorer and Lochard Team to Provide Enhanced Flight Tracking for Customers Worldwide", Apr. 28, 2003, http://www.flightexplorer.com/News/press%20releases/pr042803.asp.

Source Code received by Rannoch Corp. from FAA, circa 1998.

"A Routine that converts an American Mode S address into its corresponding 'N' number string", Ken Banis, Feb. 17, 1992.

"Description of the U.S. Algorithm for Assigning Mode A Addresses", Robert D. Grappel, M.I.T. Lincoln Laboratory, Nov. 1991.

"Program to convert Mode S address to U.S. Tail Number", R.D. Grappel, M.I.T. Lincoln Laboratory, 1991.

"Program to convert U.S. aircraft tail numbers to Mode S code", R.D. Grappel, M.I.T. Lincoln Laboratory, 1991.

J.G. Herrero, J. A. B. Portas, F.J.J. Rodriguez, J.R.C. Corredera, "ASDE and Multilateration Mode–S Data Fusion for Location and Identification on Airport Surface," (*IEEE 1999 Radar Conference Proceedings*, pp. 315–320, Apr. 20–22, 1999).

D.C. Rickard, D. J. Sherry, S.J. Taylor, "The development of a prototype aircraft–height monitoring unit utilizing an SSR–based difference in time of arrival technique," International Conference Radar 92 (Conf. Publ. No. 365), 1992, p 250–3.

D. E. Manolakis and C. C. Lefas, "Aircraft geometric height computation using secondary surveillance radar range differences," IEE Proceedings–F, Radar, Sonar, Navigation, vol. 141, No. 2, pp. 139–148, 1994.

Request for Proposal, Noise and Operations Monitoring System, Indianpolis Airport Authority, Sep. 29, 2003.

Attachment A: Technical Specifications for a Aircraft Track and Noise Management System, Harris Mill, Miller & Hanson Inc., May 16, 2003.

Application of CNS/ATM Technologies to Airport Management, Alex Smith and Jon Baldwin, IEEE Digital Avionics Systems Conference proceedings,Nov. 2003.

Overview of the FAA ADS–B Link Decision, John Scardina, Director Office of System Architecture and Investment Analysis, Federal Aviation Administration, Jun. 7, 2002.

Automated Correlation of Aircraft Flight Tracks and Events With ATC Data, Alex Smith, Rannoch Corporation, Alexandria, Virginia.

Department of Transportation Federal Aviation Administration System Specification, Ground–Based Tranceiver (GBT) for Broadcast Services Using the Universal Access Tranceiver (UAT) Data Link, FAA–E–2973, Jan. 15, 2004.

Protest Letter dated May 16, 2002 from Otto M. Wildensteiner, U.S. Department of Transportation, Washington, DC.

"Comparison of Claims in U.S. Appl. No. 09/971,672 with Prior Art", May 16, 2002, Otto M. Wildensteiner, Department of Transportation, Washington, DC.

"Minimum Aviation System Performance Standards for Automatic Dependent Surveillance Broadcast (ADS–B)", RCTA, Inc. Washington, DC, ©1998.

"Runway Incursion Reduction Program Dallas–Ft. Worth Formal Evaluation Report, Final Report", Trios Associates, Inc. Dec. 21, 2000.

"TIS–B DFW Application for Airport Surface Situational Awareness", Trios Associates, Inc., Sep. 6, 2000.

"A Prototype Transceiver for Evaluating An Integrated Broadcast Data Link Architecture", Chris Moody & Warrent Wilson, RCTA SC–186, Aug. 17, 1995, RTCA Paper No. 449–95/SC186–033.

"The Universal Access Tranceiver (UAT)", Warren Wilson & Chris Moody, May 10, 1995.

"Terminal Area Productivity (TAP) Study Low Visibility Landing and Surface Operations (LVLASO) Demonstration Report" Surface Surveillance Products Team (AND–410) Sep. 4, 1998.

"Phase I—Operational Evaluation Final Report Cargo Airline Association ADS–B Program, FAA SafeFlight 21 Program" Apr. 10, 2000.

"Capstone Program Plan Version 1.0", Federal Aviation Administration, Mar. 10, 1999.

"TIS–B Concept and Approach", MITRE, Chris Moody, Feb. 29, 2000.

"RTCA Special Commmittee 186, Working Group 5 ADS–B UAT MOPS Meeting #2, Proposed Contents and Transmission Rates for ADS–B Messages" Chris Moody, MITRE Corp., Feb. 20, 2001.

"Airborne Information Initiatives: Capitalizing on a Multi–Purpose Broadcast Communications Architecture", R.C. Strain, J.C. Moody, E.C. Hahn, B.E. Dunbar, S. Kavoussi, J.P. Mittelman, Digital Avionics Systems Conference, Oct. 1995.

"Minutes of SC–186 WG–2 (TIS–B) Meeting", Jun. 13–14, 2000.

* cited by examiner

CORRELATION OF FLIGHT TRACK DATA WITH OTHER DATA SOURCES

CROSS-REFERENCE TO RELATED APPLICATIONS

The present application is a Divisional of U.S. Patent Application Ser. No. 10/457,439, filed on Jun. 10, 2003, now U.S. Pat. No. 6,885,340;

Application Ser. No. 10/457,439, in turn is a Non-Provisional of Provisional U.S. Patent Application Ser. No. 60/440,618, filed on Jan. 17, 2003;

Application Ser. No. 10/457,439 is also a Continuation-in-Part of U.S. Patent Application Ser. No. 10/319,725, filed on Dec. 16, 2002, now U.S. Pat. No. 6,812,890;

Application Ser. No. 10/319,725 in turn is Non-Provisional of Provisional U.S. Patent Application Ser. No. 60/343,237, filed on Dec. 31, 2001;

Application Ser. No. 10/319,725 is also a Continuation of U.S. Application Ser. No. 09/97 1,672, filed on Oct. 9, 2001, now U.S. Pat. No. 6,567,043;

Application Ser. No. 09/971,672 is in turn a Divisional of U.S. Patent Application Ser. No. 09/516,215, filed Feb. 29, 2000, now U.S. Pat. No. 6,633,259;

Application No. 09/516,215 is a Non-Provisional of Provisional U.S. Patent Application Ser. No. 60/1 23,170 filed Mar. 5, 1999;

Application Ser. No. 10/319,725 is also a Continuation-in-Part of U.S. Patent Application Ser. No. 09/5 16,215, filed Feb. 29, 2000, now U.S. Pat. No. 6,633,259;

Application No. 09/516,215 is a Non-Provisional of Provisional U.S. Patent Application Ser. No. 60/1 23,170, filed Mar. 5, 1999;

Application Ser. No. 10/457,439 is also Continuation-in-Part of U.S. Patent Application Ser. No. 09/516,215, filed Feb. 29, 2000, now U.S. Pat. No. 6,633,259;

Application No. 09/516,215 is a Non-Provisional of Provisional U.S. Patent Application Ser. No. 60/123,170, filed Mar. 5, 1999.

The Parent application in turn was a Continuation-In-Part application of U.S. patent application Ser. No. 09/516,215, filed Feb. 29, 1999, entitled "METHOD AND APPARATUS FOR IMPROVING THE UTILITY OF AUTOMATIC DEPENDENT SURVEILLANCE", Now U.S. Pat. No. 6,633,259, which is incorporated herein by reference in its entirety.

The Parent application was also a Continuation-In-Part of U.S. patent application Ser. No. 10/319,725, filed Dec. 16, 2002 now U.S. Pat. No. 6,812,890, entitled "VOICE RECOGNITION LANDING FEE BILLING SYSTEM", incorporated herein by reference in its entirety.

The Parent application also claims priority from Provisional U.S. Patent Application No. 60/440,618, filed Jan. 17, 2003, incorporated herein by reference in its entirety.

The subject matter of the present application is related to the following issued U.S. Patents, assigned to the same assignee as the present invention, all of which are incorporated herein by reference in their entirety:

U.S. Pat. No. 6,049,304, issued Apr. 11, 2000, entitled "Method and Apparatus for Improving the Accuracy of Relative Position Estimates In a Satellite-Based Navigation System";

U.S. Pat. No. 5,999,116, issued Dec. 7, 1999, entitled "Method and Apparatus for Improving the Surveillance Coverage and Target Identification in a Radar Based Surveillance System";

U.S. Pat. No. 6,094,169, issued Jul. 25, 2000, entitled "Passive Multilateration Auto-Calibration and Position Error Correction";

U.S. Pat. No. 6,384,783, issued on May 7, 2002, entitled "Method and Apparatus for Correlating Flight Identification Data With Secondary Surveillance Radar Data";

U.S. Pat. No. 6,211,811, issued Apr. 2, 2001, entitled "Method and Apparatus for Improving the Surveillance Coverage and Target Identification in a Radar Based Surveillance System";

U.S. Pat. No. 6,448,929, issued Sep. 10, 2002, entitled "Method and Apparatus for Correlating Flight Identification Data With Secondary Surveillance Radar Data"; and U.S. Pat. No. 6,567,043, issued May 20, 2003, entitled "METHOD AND APPARATUS FOR IMPROVING THE UTILITY OF AUTOMATIC DEPENDENT SURVEILLANCE".

FIELD OF THE INVENTION

The present invention relates to the field of aircraft tracking and identification. The present invention is specifically directed toward a technique for passively retrieving and correlating aircraft data from existing aircraft data sources. Six embodiments of present invention are described wherein aircraft flight track may be calculated and correlated with other data or where flight track data may be enhanced with other data.

BACKGROUND OF THE INVENTION

The Federal Aviation Administration (FAA) requires all passenger carrying aircraft over 30 seats be equipped with so-called "Mode S" transponders. Mode S transponders are capable of transmitting a number (e.g., 25) of formats of coded data. This coded data includes such information as a unique 24-bit binary address for each aircraft.

The aircraft registration number may be derived from this 24-bit binary address. The coded Mode-S data also includes such information as aircraft altitude and may be transmitted continuously throughout a flight at a minimum rate of 1 Hz (i.e., once per second). Coded Mode-S data may be collected passively without any connection to air traffic control equipment.

The FAA has endorsed the Aircraft Communications Addressing and Reporting System (ACARS) system, which uses various data link technologies including the VHF communication band, HF and SATCOM along with a ground station network to allow aircraft to transmit and receive messages of coded data. Many domestic and international carriers have equipped their aircraft with ACARS equipment.

ACARS equipment is capable of transmitting a number of types of coded data. ACARS currently uses frequency shift keying (FSK) as a modulation scheme, however, other modulation schemes including minimum shift keying (MSK) and time division multiple access (TDMA) are being evaluated for future improvement of ACARS. ACARS data includes such information as the aircraft registration number and airline flight identification number (flight number).

ACARS transmissions from a single aircraft may be sent at varying intervals from as little as no transmissions in a single flight to several transmissions per minute. ACARS transmissions may be collected passively without any connection to air traffic control equipment.

None of the currently used or planned Mode S downlink formats provides for the transmission of flight identification data. There are a number of methods including Automatic Dependent Surveillance-Broadcast (ADS-B) and multilateration which allow for the precise determination of aircraft location through the Mode S downlink formats on a frequent basis. ACARS transmissions, while capable of encoding aircraft position and altitude, are not typically used for position determination as the frequency of ACARS transmissions may be too infrequent to allow one to accurately and timely determine the exact position of an aircraft.

Reducing noise from aircraft landing and taking off is a problem in the art. Determining which aircraft are violating noise restrictions is an essential part of the noise reduction problem. In the Prior Art, airports relied on post-processed flight track data (typically from airport radar systems) which would then be correlated with acoustical noise information and presented to management for analysis the next day or several days later. The acoustical data was usually collected by microphones or noise monitoring terminals located (NMTs) around the airport.

These NMTs would generally store a day's worth of noise information and then download that information each night for correlation with the post-processed flight tracks. However, since noise and flight track data may be not correlated until many hours after a noise event, it may be difficult if not impossible to respond to specific noise complaints or noise incidents, or to accurately determine post hoc which airplane caused which noise event. What is needed in the art is a system which allows for almost instantaneous correlation between noise data and flight tracks.

Triangulating on an aircraft's transponder signal may require decoding real-time transponder replies at several locations, time-stamping them and sending them to a central location for matching. Matching would attempt to pair up the transponder signals that had emanated from the same target.

An example of a Prior Art method for triangulating on an aircraft's transponder is disclosed in Wood, M., L., and Bush, R., W., *Multilateration on Mode S and ATCRBS Signals at Atlanta's Hartsfield Airport*, Lincoln Laboratory Project Report ATC-260, 8 Jan. 1998, incorporated herein by reference. In that method, triangulation on an aircraft's transponder relied on each remote sensor time-stamping all or most received transponder signals and passing them along to the central location for matching.

It was deemed necessary to do this since the remote sensor could not know which particular reply would be used by the central server for the matching process. This meant that a relatively high bandwidth communications medium was required between each remote sensor and the central server.

Such Prior Art methods used active interrogations to elicit the transponder replies, which allowed for some form of expectancy time for the replies. By scheduling interrogations the system estimated when replies might be received at each of the receivers and the system could then use windows in which to "listen" for replies. All replies received within these windows would then be time-stamped and then sent to the central server for matching.

This approach helped in some form to manage the required bandwidth on the link between the receiver and the central server. However, a relatively high bandwidth link is still required using this approach. Because of the practical bandwidth challenges in managing the link between the receivers and the central server it was generally thought in the Prior Art that using a completely passive approach for triangulation and multilateration would be impossible.

Multilateration and ASDI may be augmented with airline flight information available from an airlines flight reservation system. Dunsky et al, U.S. patent application Ser. No. 10/136,865, filed May 1, 2002 (Publication Number 2003/0009261 A1, published Jan. 9, 2003) entitled "Apparatus and method for providing live display of aircraft flight information", incorporated herein by reference, describes the integration of Megadata's PAssive Secondary SUrveillance Radar (PASSUR) and airline flight information.

SUMMARY OF THE INVENTION

The present invention includes hardware, software, and a methodology for correlating flight identification data with aircraft registration numbers. The present invention includes a 1090 MHz receiver, Mode S decoder, ACARS receiver, and ACARS decoder, aircraft registration numbers and other Mode S data are correlated with the current flight identification of an aircraft as well as other data provided from ACARS messages.

The present invention provides for linking (correlation) of flight identification data from ACARS messages with the data from Mode S transponder transmissions, which are more frequent and provide for real time position and altitude determination. The effect of which is to provide the same data as an air traffic controller would see on his or her screen without the need for active interrogation or connection to any Air Traffic Control equipment.

The present application includes six additional embodiments which are improvements and/or enhancements to technology previously developed by the inventors and the assignee of the present application.

In a first embodiment of the present invention, ACARS data may be used to determine aircraft weight and identification. Using this information, along with flight track, aircraft thrust may be calculated accurately. From calculated aircraft thrust and flight track, the amount of noise that the aircraft produced may be accurately determined using any one of a number of noise calculation models—and without the need for microphones or noise monitoring devices.

In a second embodiment, Real Time Noise and Flight Tracking is provided. For airport management applications, the surveillance element allows real time flight tracking and complete aircraft identification, which is a feature which has not previously been available to airport management and other users. Since the flight track information may now be available to the airport in real-time, the airport may make use of noise data from the NMTS in real-time to provide a real-time correlated set of aircraft flight tracks and noise measurements. This correlated set of flight tracks and noise measurements allows the airport to respond in real time to any inquiry such as a noise complaint that may be telephoned into the airport, or to put certain information on a real-time airport noise report, such as might be presented on the Internet at an airport website.

In a third embodiment, a low bandwidth communication path may be used between multiple multilateration sensors and central server. Intelligent processing techniques are used at each of multiple multilateration receivers. Thus, the need to timestamp and send all messages within a time window or continuously over time has been overcome. The technique includes the use of logic or rules at each receiver which may be applied to incoming replies and effectively filter out unnecessary and redundant replies.

In a fourth embodiment of the present invention, tracking aircraft from radar or transponder signals provides a real-time picture of the aircraft's position as well as identification information. This picture may also be stored and replayed up to the current time for a variety of reasons including airport management and air traffic control. Aircraft positions may be tracked around the airport surface as well as in terminal and en route areas. Fusing ACARS data with this surveillance information adds a variety of other information including aircraft/pilot intent as well as other details.

In a first variation of this fourth embodiment, integration with ASDI may be provided. On its own, the multilateration portion of the present invention provides highly accurate aircraft tracks. Coverage may be dependent on the number and placement of the remote sensors. A large variety of information may be available from the aircraft's registration information which may be provided from the Mode S transponder code. The transponder derived information includes such fields as aircraft make, model, type, serial number, owner, and engine type. In conjunction with other sources such as ACARS, other information may be available on the target such as flight number and aircraft/pilot intent.

In second variation of the fourth embodiment, the tracking system may be used to track ground vehicles around the surface areas of airport thereby building up a complete picture of all moving and stationary traffic around an airport ranging from service vehicles and catering trucks to emergency service vehicles.

In a fifth embodiment of the present invention, the multilateration system provides accurate high update rate surveillance information on each target. The Mode S transponder derived information provides details on the aircraft type including registration which may be used to determine the avionics equipage in the aircraft.

In a sixth embodiment of the present invention a means for correcting reported aircraft altitude based on pressure (barometric altitude) is provided. Since pressure varies depending on local weather conditions, it may impact the performance of airport management systems that rely on precise altitude information, for example for billing for landing fees, or collision avoidance systems.

DETAILED DESCRIPTION OF THE INVENTION

The present invention is now described with reference to the Figures where like reference numbers denote like elements or steps in the process.

Figure 1:
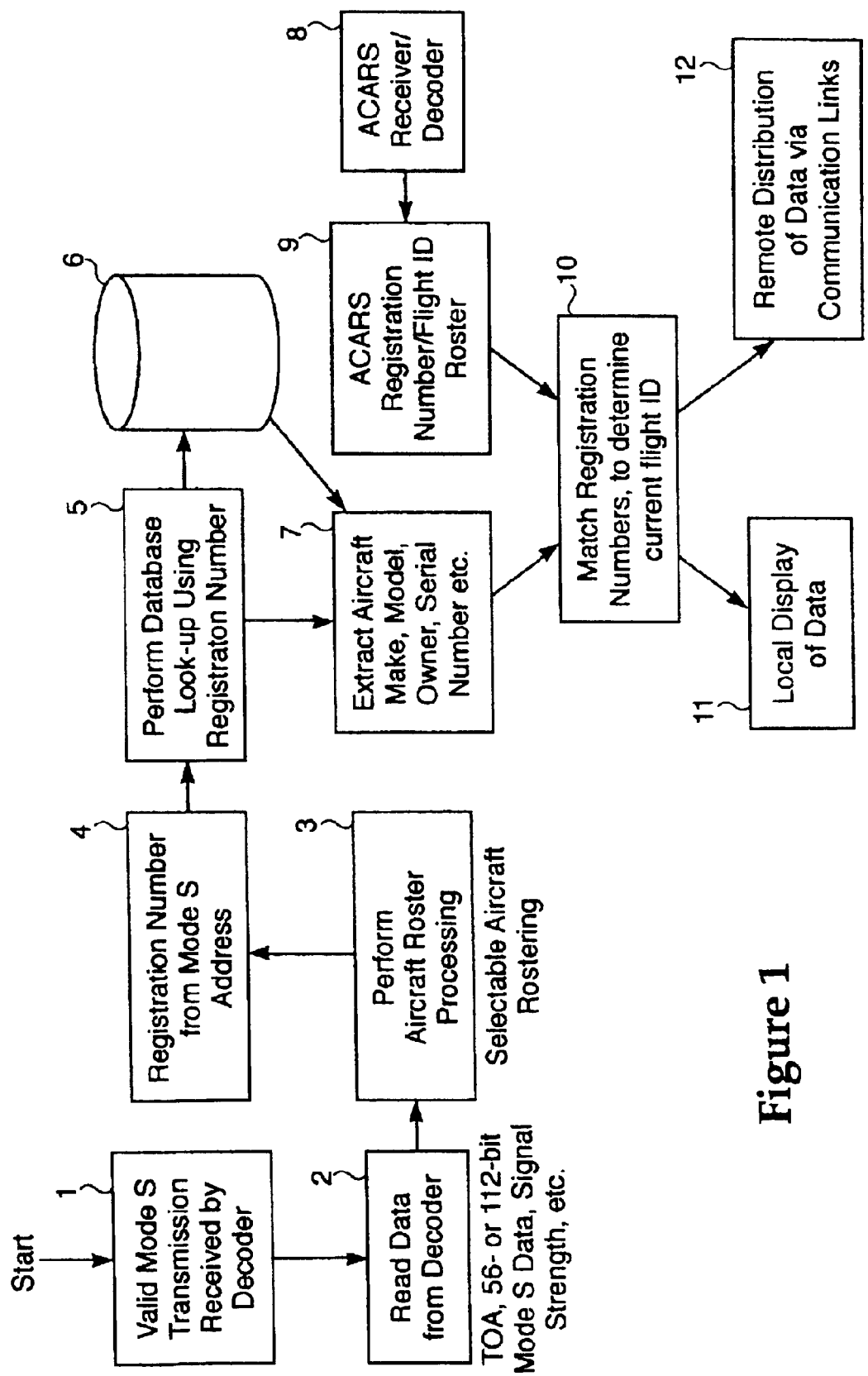
FIG. 1 is a flow chart of a process for decoding secondary surveillance radar transmissions, decoding ACARS transmissions, and correlating flight identifications from ACARS with registration details from both SSR and ACARS.

Referring to FIG. 1, 1090 MHz, Mode S transponder signals are received by a receiver/decoder in step 1. In step 1, the received analog Mode S signal may be converted to digital data. In step 2, the Mode S address may be extracted from the digital data. The Mode S address may then be stored in a roster in step 3 and used to generate the aircraft registration or "N" number which may be extracted in step 4. U.S. aircraft registration numbers may be determined directly by an algorithm, while foreign aircraft registrations may be determined by a lookup table.

The aircraft registration number from step 4 may then be used to perform a database look-up in step 5. Step 5 utilizes a database 6 which may contain details of aircraft make, model, serial number, owner/operator, owner/operator address, engine type, engine noise class, engine modifications and any other pertinent data associated with a particular aircraft. Such data may be extracted in step 7.

Simultaneously or concurrently with Mode-S decoding, a receiver/decoder capable of receiving and decoding ACARS signals receives and decodes such signals as illustrated in step 8. ACARS transmission may occur over VHF frequencies such as 131.550 MHz, 130.025 MHz, 129.125 MHz, 131.725 MHz, 131.450 MHz, 131.550 MHz, and 131.475 MHz, and/or HF and/or SATCOM and/or any other data link method and/or any other modulation scheme, including VDL Mode 1, 2, 3 or 4.

Aircraft registration number and flight ID number, as well as other ACARS message details, including but not limited to, "Out, Off, On and In" reports, cockpit message reports, fuel reports, peripheral message reports and miscellaneous message reports are then stored in a roster in step 9. Data from step 9 may then be matched with data from step 7. In step 10, aircraft registration numbers from steps 7 and 9 are matched to determine flight identification number.

The flight identification number may be thereby associated with the corresponding aircraft registration number as a result of step 10. If there is no correlation between registration numbers from steps 7 and 10, the data may also be stored. The resultant information from steps 7, 9, and 10 may then be displayed locally over a display terminal in step 11 and/or distributed to remote locations via communication links as illustrated in step 12.

Figure 2:
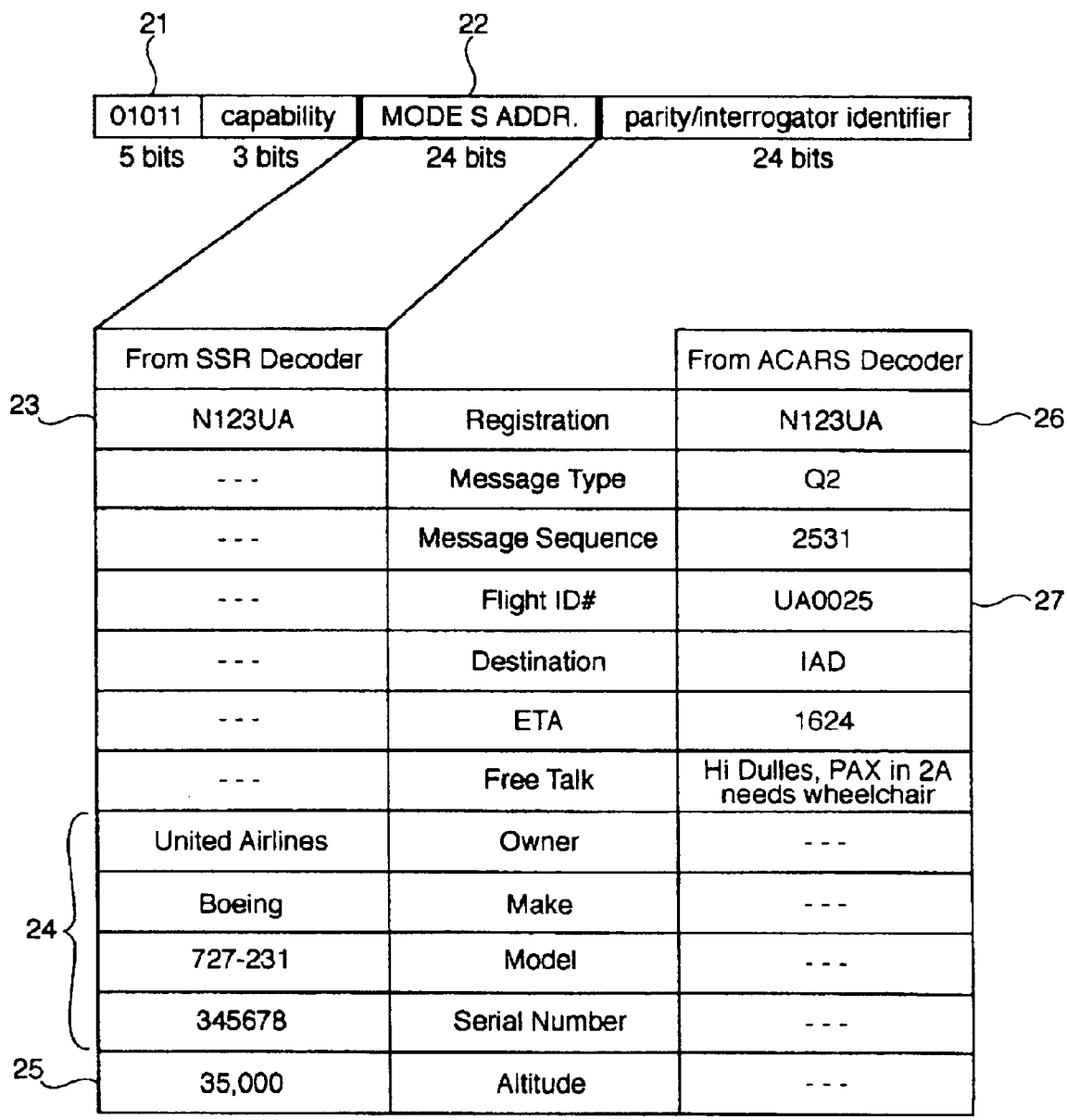
FIG. 2 is a diagram of DF-11 Mode S transponder transmission data and ACARS data, indicating the position of the Mode S address from within a Mode S transmission and illustrating the association between the Mode S address and derived registration data.

Referring to FIG. 2, a DF-11 Mode S transponder transmission 21 may be received and aircraft Mode S address 22 may be extracted. Mode S address 22 may be either converted to a U.S. aircraft registration number 23 through an algorithm or determined to be a non-U.S. registered aircraft whose registration may be looked-up from a database. Data 24 associated with a particular registration number, such as aircraft owner, make, model, and serial number may then be looked-up from a database. Aircraft altitude 25 may be decoded from other Mode S transponder signals which include altitude information.

Simultaneously or concurrently, ACARS messages are also received and decoded and data such as aircraft registration 26 and flight ID 27, as well as all other ACARS message data may be stored in a database and memory. All the aforementioned data available from the Mode S transponder transmission may then be correlated with ACARS message data by matching registration number 23 from the SSR decoder with registration number 26 from the ACARS decoder.

The resultant correlated data, as illustrated in FIG. 2, contains a host of information specifically identifying an aircraft. Such information, when correlated with multilateration data, may provide a complete and accurate picture of aircraft identity and position. Such information may be useful to an airline in tracking individual aircraft for business planning purposes. In addition, such information may be used for ground tracking purposes (e.g., for noise abatement verification). Moreover, such data may be re-transmitted on a data channel to other aircraft to provide a real-time display of aircraft in the vicinity.

Figure 3:
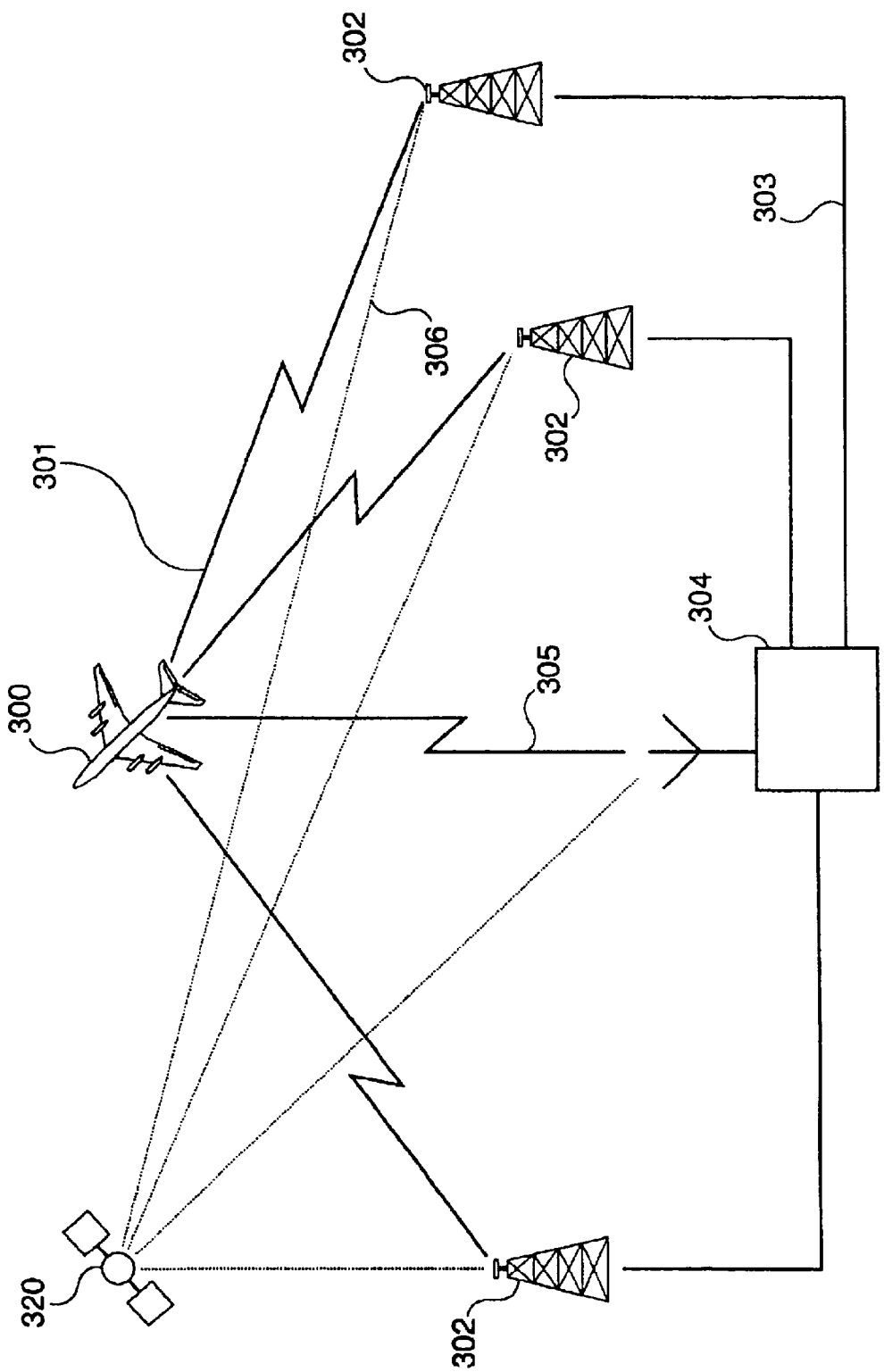
FIG. 3 is a diagram of an aircraft multilateration system that integrates SSR and ACARS data.

Referring to the embodiment depicted in FIG. 3, the integration of ACARS and SSR data is shown with an aircraft multilateration system. Aircraft 300 transmits SSR signals 301 at least once per second. SSR signals 301 may be received at one or more of multiple ground stations 302. The time of arrival at each ground station may be determined by reference to a standard time reference provided by GPS signal 306 from GPS satellite 320.

One or more of ground stations 302 may then send time-stamped SSR data 303 to central workstation 304. Time-stamped SSR data 303 includes the Mode S address of aircraft 300 which may be unique to every aircraft and may be correlated to a registration number. At central workstation 304 a processor then calculates the position of the aircraft using difference time of arrival (DTOA) techniques. The aircraft's location and registration number are then known and Day be displayed to a user.

Also at the central workstation 304, ACARS data may be received and modulated, providing a roster or look-up table between registration number and aircraft assigned flight number. Thus, the entire system provides an independent air traffic control picture complete with aircraft position and identification by flight number, using only passive radio reception techniques.

In one preferred embodiment, an adaptive or learning database of aircraft registration information and related details may be implemented as database 6 of FIG. 1. One difficulty in decoding an aircraft Mode S address is that one may not be able to match every address to a unique aircraft identification number without having either a look-up table or conversion algorithm.

For example, in some instances, an aircraft might be brand new and not in the present database or the look-up table might not be available from a particular country of origin. It should be noted that unidentifiable registrations for these reasons are expected to be the minority of aircraft. However, for reasons such as noise monitoring, it may still be important to identify all or as many aircraft as possible.

Figure 4:
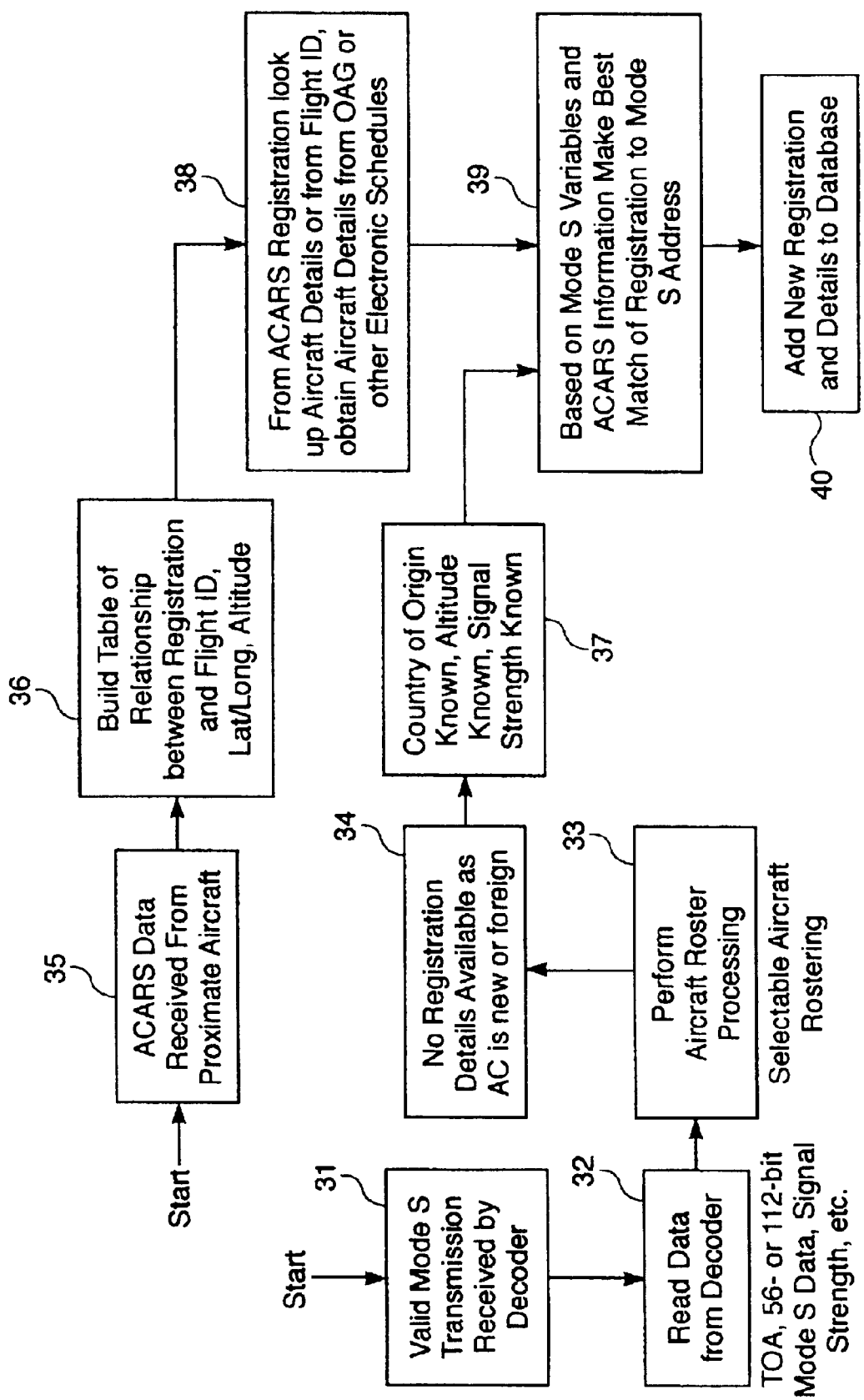
FIG. 4 is a block diagram illustrating the self-learning database system of the preferred embodiment of the present invention.

For this reason it is advantageous to have a database of aircraft Mode S addresses and registrations which may be updated regularly, such as in a preferred embodiment illustrated in FIG. 4 for a self-learning database.

Referring to FIG. 4, a Mode S transmission may be received by a decoder in step 31, and may be read from the decoder in block 32. A roster or table may be built for the aircraft in general area 33. In the example of FIG. 4, because the aircraft may be of foreign registration, no registration look-up may be available as illustrated in step 34. However, the country of origin may be known as are other details provided by Mode S decoding process 37.

Meanwhile, an ACARS receiver receives and processes ACARS data in step 35 and a table may be built in step 36 matching flight number to registration, and other details, based solely upon the ACARS information. Also, details on a particular aircraft may be known from the registration number, by looking up in other commercially available databases, such as the OAG schedule in step 38.

Based on the spatial and other information, a best estimate may be made of the match between the aircraft Mode S address and a registration number in step 39. The new registration/mode S look-up may then be entered into the database 40 for future use.

Since many foreign aircraft may tend to visit the same airports or airspace more than once, (e.g., routine commercial flights), the data acquired using such a technique may be accessed the next time such an aircraft re-visits the airspace. In addition, the system of the present invention may be networked to other such systems over a wide area to share such "learned" data.

Note that this technique may also be used to validate or correct information that may be already in a database. Thus, over a period of time, database data may be corrected or upgraded. Again, such data may be accessed during subsequent visits of an aircraft to an airspace, or may be shared with other systems so as to update a database for an overall network.

In the first embodiment of the present invention, ACARS data may be used to determine aircraft weight and identification. Using this information, along with flight track, aircraft thrust may be calculated accurately. From calculated aircraft thrust and flight track, the amount of noise that the aircraft produced may be accurately determined using any one of a number of noise calculation models.

Sample parts of an ACARS message used by the invention are illustrated in Table I below.

TABLE I

| MESSAGE | DESCRIPTION |
| --- | --- |
| C-GDSU AC0878 YYZ ZRH | Aircraft Registration C-CDSU, Flight number Air Canada 878, going from Toronto to Zurich |
| TTL PAX 149 | 149 total passengers on board |
| OA 51, OB 54, OC 44 | 51 in first class, 54 in business class, and 44 in steerage |
| FOB 44.8 | 44,800 kilograms of fuel on board |
| ZFW 108.3 | Zero fuel weight is 108,300 kilograms |
| TOW 152.6 | Actual take off weight is 152,600 kilograms |

For a more complete listing of ACARS messages refer to Flyn, E., *Understanding ACARS, Third Edition*, Universal Radio Research, 1995, incorporated herein by reference.

Figure 5:
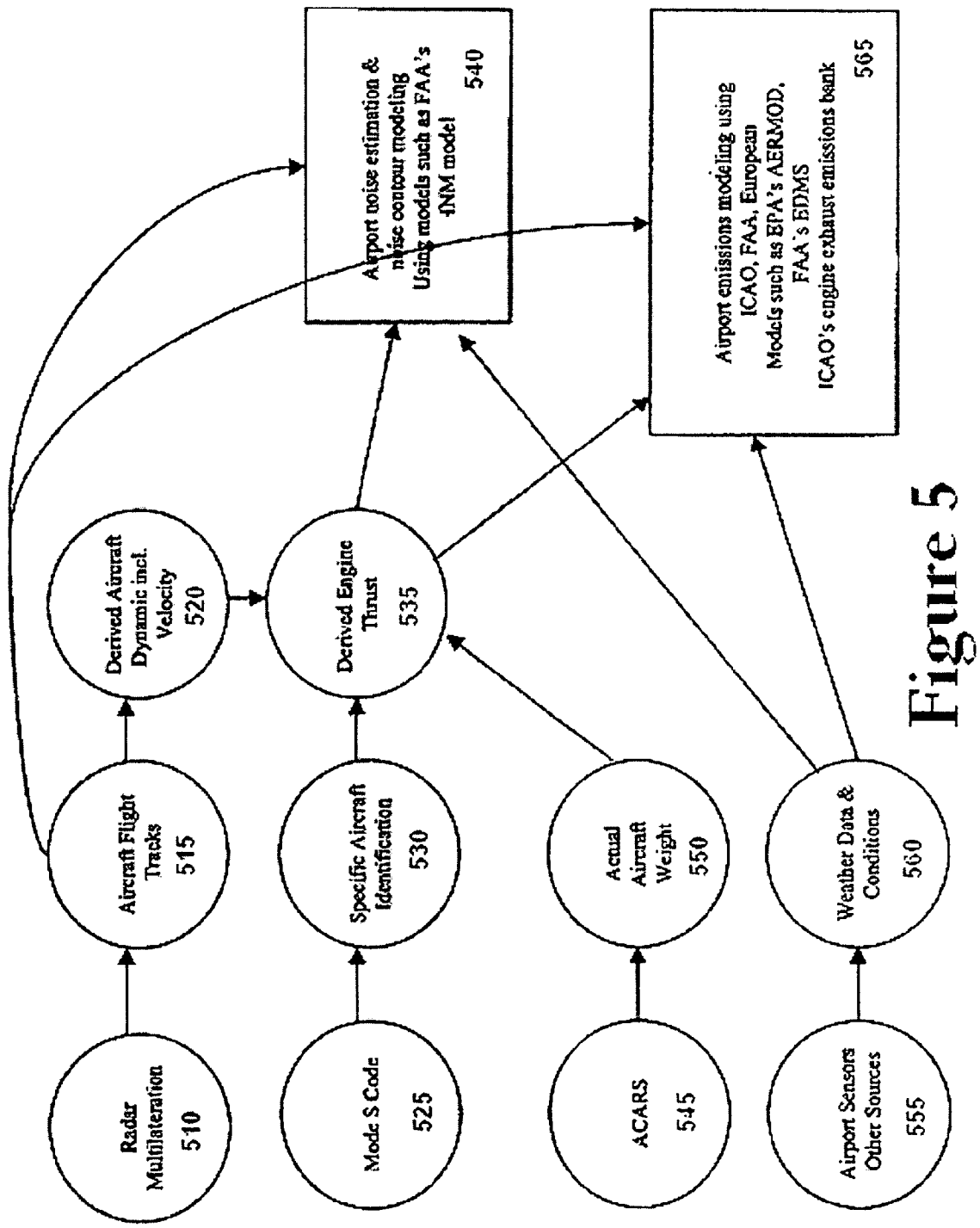
FIG. 5 is a flowchart illustrating the operating steps of the noise estimation and calculation process of the first embodiment of the present invention.

FIG. 5 is a flowchart illustrating the operating steps of the noise and emissions estimation and calculation process of the first embodiment of the present invention. For application to noise monitoring, it may be very useful to know the exact type of aircraft and its registration details, which are available from the transponder information. The aircraft weight information available from the registration may be the aircraft's gross take off weight. While useful, for the purposes of noise monitoring, more useful information may be the aircraft's actual weight, which varies from flight to flight depending on the aircraft's passenger and cargo load as well as fuel on board.

The actual weight of the aircraft, coupled with the exact aircraft and aircraft engine type allows accurate estimation of engine thrust in real time and in a post-processed form. If accurate estimates of engine thrust may be calculated, then a more accurate estimate of the noise produced by aircraft engines may be determined. The method of the first embodiment of the present invention uses a combination of gross take off weight from the aircraft registration details coupled with actual weight information available from aircraft ACARS transmissions. This method therefore provides highly accurate estimates of the aircraft's weight throughout the aircraft's operation.

As a result, a highly accurate modeling of the noise and the emissions around an airport may be produced. Since the government uses highly scientific models to calculate noise and emissions, the whole point is to use a high fidelity source of input. Without knowing the real engine types and the thrust, the methods of the Prior Art may make only rough estimates. The types of emissions modeled in the first embodiment of the present invention include but are not limited to ground level ozone, nitrogen dioxide, and sulfur dioxide.

Referring to FIG. 5, Radar and/or Multilateration block 510 generates data indicating aircraft position in the vicinity of the airport. From this position information, aircraft flight tracks 515 may be generated, providing a three-dimensional flight path data track of individual airplanes in and around an airport of interest. From flight track data in block 515, dynamic aircraft information, such as velocity and acceleration may be derived. For example, integrating flight track data over time may produce velocity data. Integrating velocity data may produce acceleration data. Other information, such as climb rate may be obtained from aircraft tracking data.

In block 525, Mode-S code data may be retrieved from a Mode-S transponder on the aircraft (if so equipped). In block 530, the specific aircraft may be identified from the mode-S data. Block 545 represents receipt of ACARS data from the aircraft. As illustrated above, actual aircraft weight may be obtained from the ACARS data in block 550. As noted in the present application, once specific aircraft identification data has been obtained, data for the airplane, such as engine type (and even serial numbers) may be obtained by correlating aircraft identification data with data from other databases (e.g., FAA).

Aircraft identification data (which may include engine type) along with dynamic aircraft information and aircraft weight, may be fed into block 535 to determine engine thrust. Note that other types of data may also be fed to block 535, such as wind data and other weather information 560, which may affect engine thrust (e.g., headwinds and the like). In block 535, engine thrust may be calculated using one of a number of known algorithms. Since the dynamic aircraft information and aircraft weight are known, mathematical calculations may be made to determine the amount of thrust necessary to produce the resultant flight track for given weather conditions. Fuel burn rates may even be calculated to compensate for decrease in fuel weight as the aircraft travels on its flight path.

Other airport sensors and sources of data 555 including noise monitoring equipment and weather equipment may generate weather data and conditions 560. This data may include atmospheric pressure, wind direction and intensity, humidity, and precipitation. These factors may affect engine operation, noise levels, and emissions.

In block 540 airport noise estimation and noise contour modeling may be generated using, for example, the FAA's Integrated Noise Model (INM), suitably modified for use with the present invention. The latest release of this noise model may be downloaded from the FAA website at http://www.aee.faa.gov/Noise/inm and is incorporated herein by reference in its entirety. Other types of noise modeling may be used within the spirit and scope of the present invention, including proprietary noise modeling methods and the like. Such noise modeling methods may be enhanced in the present invention by providing more accurately calculated thrust measurements (from more accurate weight and flight track data), as well as specific engine type and model data. Noise varies from one engine type and model to another, and with different thrust levels and environmental conditions. Thus the present invention more accurately models noise levels that prior art techniques.

In block 565, airport emissions may be modeled using various known models, suitably modified for use with the present invention. Examples of such emissions models include those produced by the International Civil Aviation Organization (ICAO), the Federal Aviation Administration (FAA), Environmental Protection Agency (EPA) or European models. The ICAO Aircraft Engine Exhaust Emission Databank may be downloaded from http://www.qinetiq.com/aviation_emissions_databank and is incorporated herein by reference in its entirety. The EPA's AERMOD model is described, for example, in AERMOD: DESCRIPTION OF MODEL FORMULATION (Version 0222) EPA 454/R-02-002d, Oct. 31, 2002, incorporated herein by reference in its entirety. The FAA's Emission and Dispersions Modeling System (EDMS) may be downloaded from http://www.aee.faa.gov/emissions/EDMS/EDMShome.htm and is incorporated herein by reference in its entirety.

In a second embodiment of the present invention, for airport management applications, the surveillance element allows real time flight tracking and complete aircraft identification, which may be a feature which has not previously been available to airport management and other users. Since the flight track information may now be available to the airport in real-time, the airport may make use of noise data from the NMTS in real-time to provide a real-time correlated set of aircraft flight tracks and noise measurements.

Real-time noise tracking allows the airport to respond in real time to any inquiry such as a noise complaint telephoned into the airport. In addition, real-time noise tracking allows certain information to be presented in a real-time airport noise report, such as might be presented on the Internet at an airport website.

Figure 6:
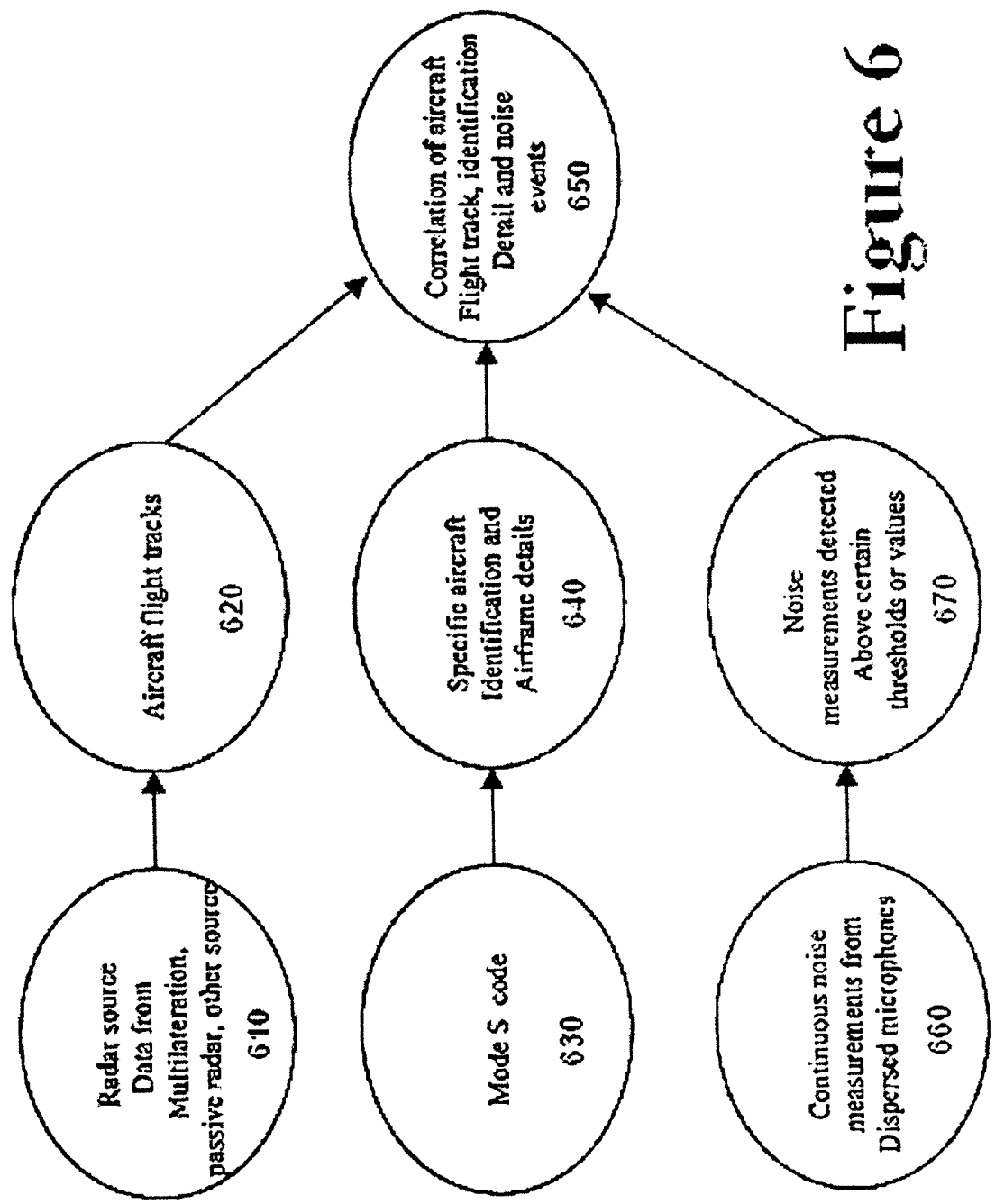
FIG. 6 is a flowchart illustrating the operating steps of the real-time noise tracking system of the second embodiment of the present invention.

FIG. 6 is a flowchart illustrating the operating steps of the real-time noise tracking system of the second embodiment of the present invention. In step 610, radar or tracking source data from multilateration, passive radar, or other sources may be input to the system. In the preferred embodiment, this may comprise multilateration data produced by one or more of the multilateration apparatus produced by the assignee of the present invention, Rannoch Corporation, of Alexandria, Va., and described in the patents and parent applications incorporated by reference above.

The use of multilateration data avoids having to tap into the tower radar data stream. As noted previously, such radar data was typically only available as tape data provided at the end of a day or shift, and thus generally not available in real-time. Tapping into tower radar data in real time may require FAA approval and runs the risk of interfering with tower radar systems, which could be a liability concern. Multilateration, on the other hand, uses an independent set of multilateration equipment that need not be tied to any tower equipment, and thus comprises an independent data stream available in real-time.

In step 620, two or three-dimensional flight tracks are determined for an aircraft, based upon broadcast aircraft identification data and position data (e.g., from multilateration) These flight tracks accurately illustrate the path of the airplane in its approach and departure from an airport. Calculation of a flight track may be a simple as connecting together a series of position data points recorded periodically from multilateration or other techniques. Cubic spline curve smoothing or other curve generating techniques may be used to interpolate data between reported data points. Alternately, flight tracks may be reported as a series of actual position data points.

In step 630, Mode S transponder codes are received. If a multilateration system is used, these Mode-S codes may be received by the same equipment used for flight tracking. As noted above, the mode-S codes themselves may provide a wealth of information about an aircraft. If correlated with an aircraft database, even more information may be retrieved to identify aircraft model and serial number, engine type and serial number, aircraft owner, and the like, as illustrated in step 640.

In step 660, continuous noise measurement may be recorded by microphones or other noise measuring devices strategically located near an airport operating area. These devices may be located near flight tracks, or may be located near sources of noise complaints, or may be portably mounted (e.g., on a mobile van, truck, trailer, or the like). The location of the noise monitoring device relative to the airport may be known or reported by the device. The noise measuring device provides a data stream (analog or digital) of noise conditions at its location, and may be suitably filtered or directed to measure specifically aircraft type noises. Such noise measuring devices are known in the art.

In step 670, a threshold may be applied to the noise measurement device such that only noise levels above a predetermined threshold may be reported. Alternately, this threshold may be used to alert the system to preserve or track data for aircraft when a noise event has occurred. Alternately, all noise data may be reported, and then a noise profile generated to determined which aircraft have potentially violated noise regulations. The use of the noise threshold may be therefore optional, depending upon application. The use of the noise threshold may, however, reduce computational requirements, particularly at busy airports.

In step 650, data from steps 610, 620, 530, 640, 660, and 670 may be combined to correlate flight track, identification detail, and noise events. From flight track data and noise data, the aircraft producing a noise violation (usually due to failure to follow arrival or departure procedures) may be readily identified. Aircraft identification information associated with flight track (e.g., from mode-S data) may be obtained from the correlation of flight track and identification data.

Since this data may include aircraft owner, address, and the like, a modified version of applicant's automated billing system (incorporated previously by reference) may be used to automatically generate noise violation reports and invoices for noise violation fines, and the like. This real-time reporting would also allow airport operators to advise pilots that they are in violation of noise rules. Since many approaching aircraft may use similar flight paths at similar times, other approaching aircraft may be able to adjust their flight paths to reduce noise complaints.

Thus, unlike Prior Art systems, which require an almost manual correlation of recorded noise with recorded flight tracks, many hours after the fact, the present invention provides an automated technique which may be used in real-time. This real-time feature allows for more careful monitoring of aircraft noise and thus may result in better and more effective noise reduction in the vicinity of airports.

Figure 7:
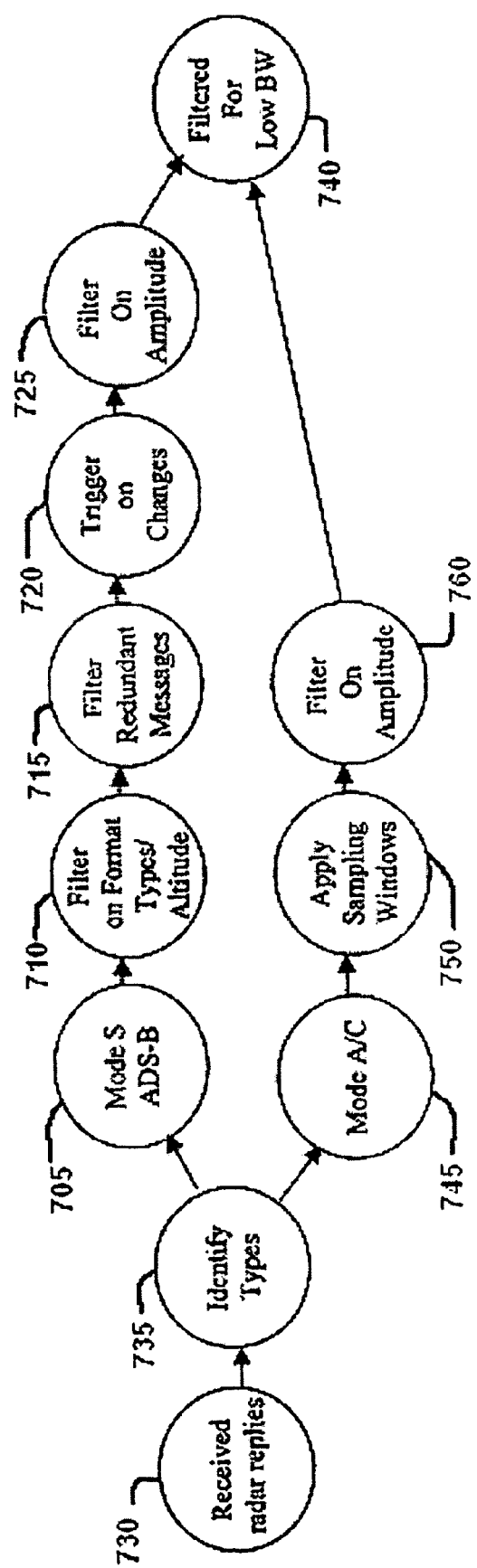
FIG. 7 is a flowchart illustrating the operating steps of the intelligent processing techniques for multiple multilateration receivers of the third embodiment of the present invention.

FIG. 7 is a flowchart illustrating the operating steps of the intelligent processing techniques for multiple multilateration receivers of the third embodiment of the present invention.

In this third embodiment of the present invention, intelligent processing techniques are used at each of multiple multilateration receivers. Thus, the need to timestamp and send all messages within a time window or continuously over time has been overcome. The technique includes the use of logic or rules at each receiver which may be applied to incoming replies and effectively filter out unnecessary and redundant replies.

These rules include such techniques as altitude filtering, Mode S, Mode A/C code filtering, and change filtering, where certain replies are accepted when they change state, which greatly decreases the number of replies to be time-stamped and sent to the central server while maintaining a sufficient number of time-stamped replies to match and provide high quality aircraft tracks.

The rules apply equally to active interrogation of targets as well as passive reception of any transponder equipped targets. The technique allows the bandwidth between the server and receiver to be managed to the point that commercial voice grade telephone lines may be used as the communications medium, greatly lowering the cost of ownership of a flight tracking system using triangulation or multilateration of transponder signals. Previous techniques had used high bandwidth communications such as fiber networks or T-1 lines.

Referring now to FIG. 7, as radar replies (e.g., transponder replies to radar interrogations) are received in step 730, the receiver decoder determines the type of reply in step 735 as Mode S/ADS-B or Mode A/C. Different types of radar reply formats are subjected to different logic and rules to compress the amount of information, as illustrated in FIG. 7.

In the Mode S channel 705, the formats are filtered based on type (i.e., Uplink Format #) in step 710 and unnecessary formats removed. The information may also be formatted within an altitude band, as illustrated in step 710. For example, in step 710, all formats from aircraft above 20,000 feet may be removed. Then redundant messages may be removed in step 715 using a combination of techniques which may include only forwarding those formats where the information changes, as illustrated in step 720. For example this includes an aircraft's descending altitude on approach. Also, the signal strength may be filtered in step 725 to remove certain values, effectively limiting the range of the system. Note that all of these filtering techniques may not be required, and any combination of one or more of the filtering techniques of the Mode S path of FIG. 7 may be used within the spirit and scope of the present invention.

In the Mode A/C channel 745, time windowing techniques may be used to effectively sample the asynchronous replies. Sampling 750 may be employed at a plurality of receivers, as all have access to a common accurate synchronization time source. The result may be an intelligently filtered set of radar data that allows multilateration of each aircraft target, but with redundant and unnecessary radar signals removed. As in the Mode S filtering path, the signal strength may be filtered in step 760 to remove certain values, effectively limiting the range of the system. Note that all of these filtering techniques may not be required, and any combination of one or more of the filtering techniques of the mode A/C path of FIG. 7 may be used within the spirit and scope of the present invention.

As illustrated in step 740, both Mode S and Mode A/C signals are now filtered for low bandwidth. Once radar return signals have been filtered as set forth in FIG. 7, the filtered signals may be sent to a central processor. Since the signals have been filtered, a high data bandwidth may be not required as in the Prior Art. A lower data bandwidth path (e.g., modem) may be used to communicate from the multilateration receivers and a central station, since much of the initial filtering has taken place in the remote receivers.

In a fourth embodiment of the present invention, tracking aircraft from radar or transponder signals provides a real-time picture of the aircraft's position as well as identification information. This picture may also be stored and replayed up to the current time for a variety of reasons including airport management and air traffic control. Aircraft positions may be tracked around the airport surface as well as in terminal and en route areas. Fusing ACARS data with this surveillance information adds a variety of other information including aircraft/pilot intent as well as other details.

For example, ACARS detects when a pilot/aircraft intends to depart from a gate, while the surveillance element determines when the aircraft actually pushes back from the gate. For those aircraft taxiing around on runway surfaces it may be difficult to determine whether an aircraft is departing or arriving at any instant in time based on the instantaneous surveillance position. However, intent may be readily identified from clearance messages provided by ACARS. If other pilots and airport users knew whether a plane was departing or arriving, they would have a better idea of the intentions and direction of travel of aircraft on the ground.

ACARS data, which indicates flight number and other aircraft and flight identification information may be fused with other data to show whether an aircraft is departing or arriving on an onboard or other type of aircraft position display. This data may be displayed on an in-cockpit display, ground display, or both. The system of the present invention may obtain such information as to arrival or departure from a variety of sources.

If the aircraft is tracked then the system knows if it landed and therefore may be labeled an arrival. If a tracked aircraft pushes back from a gate, the system knows it is a departure. In addition, this information may come from ACARS in the form of departure airport/arrival airport.

For example, if the ACARS data indicates the destination airport for a flight is Chicago, and the airplane is being tracked in the vicinity of Chicago, then it may be assumed the airplane is arriving. However, if the ACARS data indicates the destination airport for a flight is Chicago, and the airplane is being tracked in the vicinity of Newark, then it may be assumed the airplane is departing. Since ACARS flight information, as illustrated above, includes both origin and destination airports, either (or both) data may be used to determine whether an airplane is arriving or departing from a given airport.

Alternately, arrival or departure information may be inferred from source/destination data from flight plan information from an FAA database interface or from the FAA ASDI (aircraft situational awareness display to industry) which the industry has access to. The use of data base data or ASDI data may delay arrival/departure determination by a minute or so if such sources are used, as it takes time to download such data.

Figure 8:
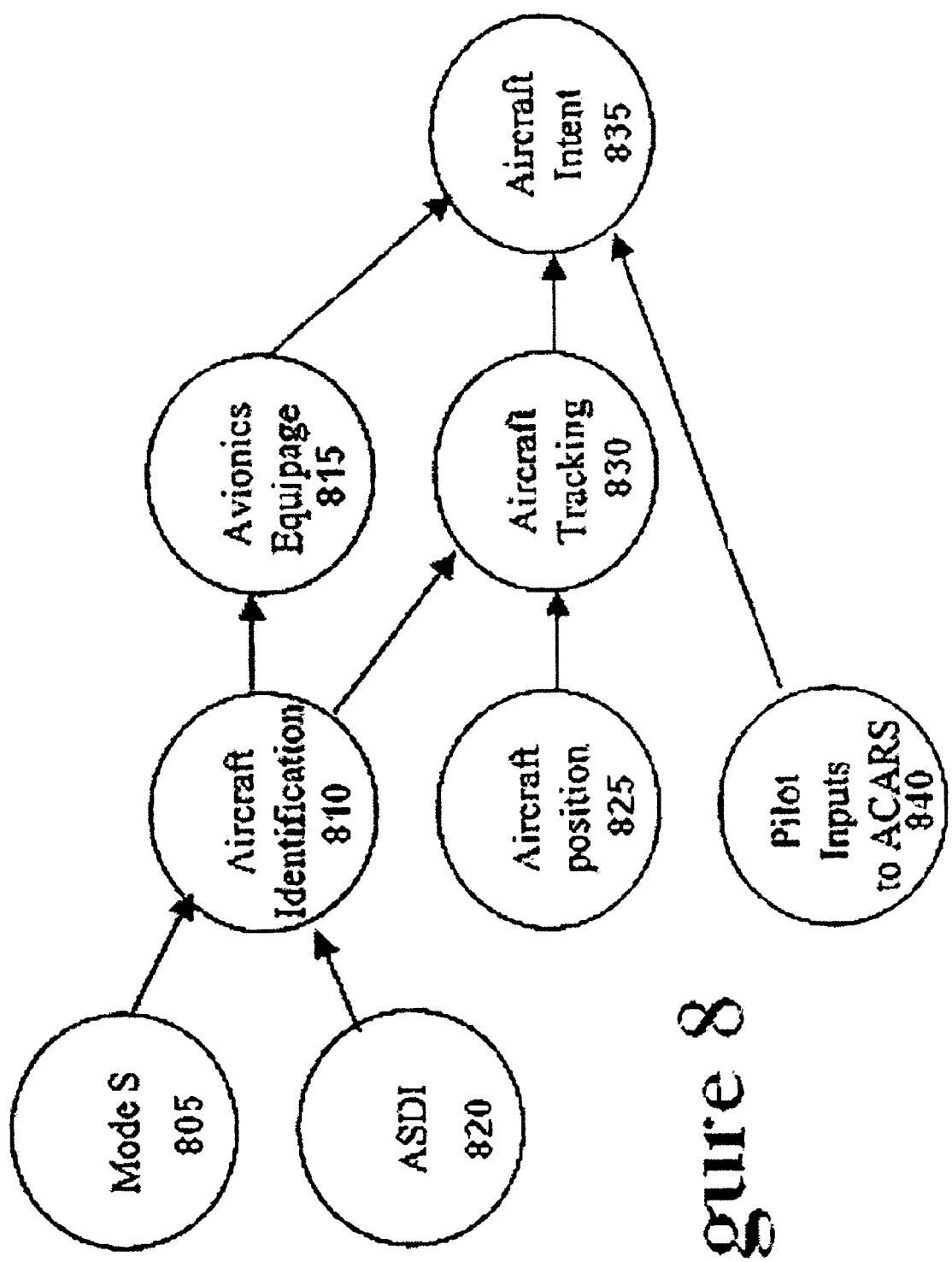
FIG. 8 is a flowchart illustrating the operating steps of the fourth and fifth embodiments of the present invention where tracking aircraft from radar or transponder signals provides a real-time picture of the aircraft's position as well as identification information, and the multilateration system provides accurate high update rate surveillance information on each target.

As illustrated in FIG. 8, an aircraft may be identified using Mode S (step 805) for airframe details or by flight number (step 820), from sources such as ASDI to produce aircraft identification 810. The aircraft may be tracked using multilateration, radar, or passive radar in step 825 to produce aircraft position data which in turn produces an aircraft track 830.

A database 815 may be used to determine the avionics and systems equipage on the aircraft, for example whether it has Category II/III landing system capability or a Flight Management System. As the pilot enters information into various systems in the cockpit, some of that information may then be broadcast over ACARS in step 840, effectively indicating pilot intent (For example, pushback from gate). From these various data sources, aircraft intent may be determined as illustrated in step 835.

In a first version of the fourth embodiment of the present invention, integration with ASDI may be provided. On its own, the multilateration portion of the present invention provides highly accurate aircraft tracks. Coverage may be dependent on the number and placement of the remote sensors. A large variety of information may be available from aircraft registration information which may be provided from a Mode S transponder code. The transponder-derived information includes such fields as aircraft make, model, type, serial number, owner, and engine type. In conjunction with other sources such as ACARS, other information may be available on the target such as flight number and aircraft/pilot intent.

The Aircraft Situational Display to Industry (ASDI) uses a data feed from the FAA's enhanced traffic management system, which includes surveillance and flight plan information for aircraft throughout the U.S. Near-real-time information on most aircraft with filed flight plans may be available from this source. When correlated with the other surveillance information, the ASDI source offers some additional information on targets such as flight plan destination and arrival airport.

ASDI provides near-real-time position data for aircraft across the U.S. and Canada. ASDI does not provide surface surveillance and does not provide full terminal area coverage in the vicinity of some airports. However, multilateration provides airport surface surveillance and terminal area surveillance where ASDI does not provide surveillance coverage. Fusing multilateration and ASDI surveillance provides gate-to-gate surveillance. Correlating the ASDI data with multilateration surveillance provides a means to obtain flight plan data for aircraft being tracked by the multilateration ground systems.

In another version of the fourth embodiment of the present invention, the multilateration surveillance system of the present invention may be used in place of the PASSUR system as disclosed by Dunsky et al. The data correlation and fusion process receives real-time aircraft position, altitude, speed and identification from the multilateration system. The identification data comprises of aircraft beacon code or Mode C code and Mode S address. Data may be time-stamped to identify the time that the update occurred. The data correlation and fusion process receives near-real-time (i.e., time delayed) aircraft position, altitude, speed and identification from ASDI. Data may be time-stamped to identify the time that the update occurred. ASDI typically has a data delay of about five minutes.

The data correlation and fusion process of the present invention forward-estimates the location and altitude of an ASDI tracked aircraft with the fixed delay removed. This forward estimation may be performed by determining or estimating the speed of the aircraft and then dividing the speed by the delay time to determine the difference in aircraft position. From the aircraft's reported flight track, the projected position can then be determined.

The data correlation and fusion process correlates the position, heading, altitude and speed of the multilateration target data and the forward estimate of the ADSI targets. A target tracked by both multilateration and ASDI will have similar position, heading, altitude and speed.

The Mode S address obtained from the multilateration system may be converted to tail number, which provides an indication of airline and/or country of registration. The data correlation and fusion process may compare airline and/or country of registration data provided by the Mode S address to the airline information provided by ASDI to confirm the data is correct. This comparison may be performed to increase confidence in the correlation of multilateration and ASDI targets. An ASDI track may be considered uncorrelated, if the track has not been correlated to a multilateration track.

Targets may be displayed in either real-time or near-real-time with the ASDI delay. The option of real-time or near-real-time may be user selectable. The correlation and fusion process performs the selection of displaying either the multilateration or ASDI tracks. In the real-time display, real-time multilateration tracks and forward-estimated uncorrelated ASDI tracks are displayed. In the near-real-time display, multilateration track updates that correspond to the time of the near-real-time ASDI target tracks are displayed along with the near-real-time uncorrelated ASDI tracks.

When multilateration tracks are correlated with ASDI tracks, the multilateration track may be displayed, as they represent the more accurate track. The associated ASDI track data for the correlated track may be not displayed. Uncorrelated ASDI track data which have no corresponding multilateration track may be displayed.

Multilateration and ASDI surveillance and flight information may be augmented with flight information provided by the airline flight information systems. An interface via the data correlation and fusion process and the airline flight information system may be implemented. Information, such as flight delays, boarding information, passenger information, boarding procedures, may be sent to the data correlation and fusion process for processing and display to systems users.

In a variation of the fourth embodiment of the present invention, the tracking system may be used to track ground vehicles around the surface areas of airport thereby building up a complete picture of all moving and stationary traffic around an airport ranging from service vehicles and catering trucks to emergency service vehicles. There are various solutions available for the tracking of ground vehicles only, and these rely on equipping the ground vehicle with some form of device, as vehicles (unlike aircraft) are not equipped with transmitting and identification devices anyway. Examples of vehicle tracking devices include http://www.racal-tracs.com/products/tdma.shtml However, it may be possible to treat the ground vehicles just like aircraft by equipping them with an aircraft-like device, such as a transponder, Mode A/C/S/ or ADS-B. Then, all targets may be tracked and displayed on the same system. Otherwise if the vehicles are tracked using another technology, they may be fused into the aircraft display system to track all targets in the one system.

In a fifth embodiment of the present invention, the multilateration system provides accurate high update rate surveillance information on each target. The Mode S transponder derived information provides details on the aircraft type including registration which may be used to determine the avionics equipage in the aircraft. Further information may be available from the aircraft's ACARS messages and controller pilot data link communications (CPDLC). This information may be fused to provide a composite picture of aircraft flight states and in turn this may be used to drive flight simulation programs, such as the SimAuthor suite of programs (see http://www.simauthor.com).

Flight simulators are usually driven by information from the aircraft's onboard navigation and surveillance systems. However, based on the fusion of data collected passively from the aircraft, it may be possible to recreate many aircraft maneuvers, such as vertical descent rate and flight path, and response to a TCAS advisory.

In a sixth embodiment of the present invention, a method of correcting reported altitude from aircraft transponders based on pressure (barometric altitude) may be provided. Since pressure varies depending on local weather conditions, it may impact the performance of airport management systems that rely on precise altitude information, for example for billing for landing fees or collision avoidance systems.

The great variability in barometric pressure may have a significant impact on the performance of landing fee and billing systems and operations monitoring systems, unless they are corrected for non-standard barometric pressure through use of a correction factor from a pressure sensing device. Each tenth of an inch of mercury equates to approximately a 100' change in reported altitude. In the example data below, the barometric pressure changed from 30.57" to 29.091" in the course of one week, during a winter storm in the Washington D.C. area. This represents a change of 1.48" or 1480 feet in reported altitude.

Current Day Maximum Pressure—29.81 Inches

Current Day Minimum Pressure—29.61 Inches

Monthly Maximum Pressure—30.40 Inches Mar. 14, 2003

Monthly Minimum Pressure—29.57 Inches Mar. 2, 2003

Yearly Maximum Pressure—30.57 Inches Feb. 16, 2003

Yearly Minimum Pressure—29.09 Inches Feb. 23, 2003

In order for flight tracking systems to successfully track aircraft that are practicing takeoffs and landings in the traffic pattern, the system needs to be able to track aircraft from the surface up to about 800–1000 feet AGL, which may be typical traffic pattern altitude for single engine aircraft.

At municipal airports, where there may be interest to track Business Jets for billing purposes, this may be much less of an issue because their altitudes may be monitored over a wider (and higher) altitude range. Those business Jets typically takeoff, climb high, and leave the airport area. However, the same algorithms may not work for the typical Mode A/C light aircraft that may be staying in the traffic pattern doing takeoff and landing practice. The smaller aircraft need to be monitored over a much smaller altitude range, as little as 0–800' AGL. The algorithms require some minimum number of hits in order to qualify a list of altitudes as belonging to an aircraft.

At a typical municipal airport it was determined that eight different 100' altitudes were required out of the 1000' to 2000' altitude band (eleven 100' altitudes) to determine (with >80% certainty) if an aircraft ascended or descended through the band.

Assuming that only six 100' altitudes are needed to track targets in the traffic pattern, and assuming that the barometric pressure could easily attain 30.42", so that aircraft are reporting their altitudes 500' lower than if the local pressure was standard (29.92"). An aircraft that took off and climbed to traffic pattern altitude (800') would reply to Mode C interrogations with pressure altitudes of −500', −400', −300', −200', −100', 0', 100', 200' and 300'.

This, of course, assumes that the aircraft has line of sight to a radar or may be being consistently interrogated by TCAS from the surface to traffic pattern altitude. The algorithm may require that the aircraft transmit at least one of two lower altitude boundaries in order for a departure track to be initiated.

If these lower boundaries are set to 200' and 300' to insure a good chance that the aircraft may be high enough to be interrogated by a ground radar (assuming that there may be one not too far away) then this example aircraft would only transmit two possible altitudes to qualify it as a departure. This may be not even close to the six hits that were hypothesized as being required, and even farther from the eight that were found to be adequate at a typical municipal airport for the aircraft that climbed well above traffic pattern altitude as they departed.

Besides the weather, other things that may affect the system include an individual aircraft's altitude encoder calibration and the general SSR radar environment, including low altitude coverage from the nearest SSR and interrogations from nearby TCAS aircraft. Flight tracking may function well some of the time but may require a barometric correction to consistently perform well.

Figure 9:
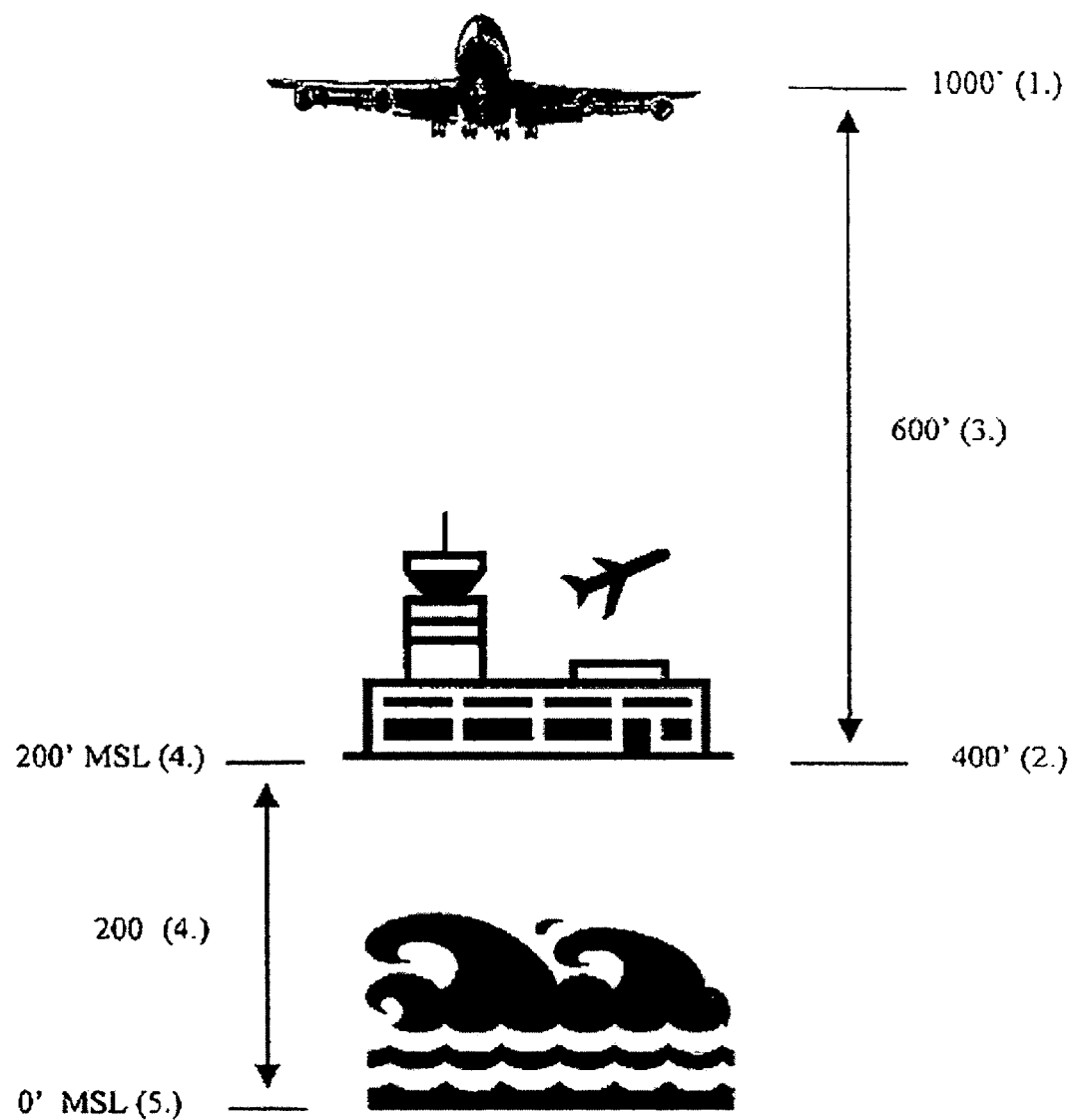
FIG. 9 is a diagram illustrating the altitude compensation technique of the sixth embodiment of the present invention.

FIG. 9 is a diagram illustrating the altitude compensation technique of the sixth embodiment of the present invention. The altitude reported from the aircraft's altitude encoder (1.) reports altitude based on a default transponder setting that assumes the current sea level pressure is 29.92" of Hg. Such a sea level pressure would rarely be the case, as weather systems are constantly affecting the atmospheric pressure.

FAA computers correct the altitude for any difference in sea level pressure from 29.92" Hg and then send the mean sea level (MSL) altitude to the controller's display. Controllers give updates to pilots on the local sea level pressure as the aircraft flies along. The pilot then sets this pressure setting on the altimeter, so that the controllers and pilots are both using MSL altitude.

However, the altitude encoder is separate from the altimeter, and always sends the aircraft's altitude based on the fixed, 29.92" Hg pressure setting. Although use of a fixed barometric calculation may produce inaccurate altitude readings, for air traffic control, this is not a problem, so long as all aircraft are using the same pressure setting—and reporting the same inaccuracy. Spacing between aircraft altitudes may still be maintained. Indeed, if the system relied upon pilots manually setting a barometric offset for transponder altitudes, the resultant reported altitudes could vary significantly if different pilots used different settings.

However, for accurately calculating flight track data from transponder encoded altitude information, a means of correcting for reported altitude inaccuracy must be found. To correct this error, altitude from a pressure sensor on the ground (2.) at the airport is collected based on the assumption that the sea level pressure is 29.92" Hg. In the present invention, the same type of pressure sensor and encoder (2.) is used as in the aircraft (1.) to insure that the two measurements have similar correlations. In this example, the "pressure altitude" on the ground at the airport, which assumes the sea level pressure is 29.92" Hg, is 400'.

The difference between (1.) and (2.) equals the altitude of the aircraft above the airport elevation. In other words, 1000'−400'=600'. This calculation is independent of actual barometric pressure, as the two pressure sensors, aircraft (1.) and ground (2.) are both of the same type and both calibrated to a default 29.92" Hg.

Now in this example, assume the actual altitude above sea level (5.) is 200 feet (4.). The altitude of the aircraft above sea level may be calculated as: 600'+200'=800'. Using this technique, actual aircraft altitude may be accurately determined based upon transponder altitudes, even though reported transponder altitudes may be inaccurate.

While the preferred embodiment and various alternative embodiments of the invention have been disclosed and described in detail herein, it may be apparent to those skilled in the art that various changes in form and detail may be made therein without departing from the spirit and scope thereof.

It should be noted that the present invention has been described in connection with the preferred embodiment. However, as one of ordinary skill in the art may appreciate, elements of the invention may be practiced individually or in various sub-combinations not including all of the elements of the preferred embodiment, and still fall within the spirit and scope of the present invention.

For example, in the preferred embodiment, position and identification information are obtained and displayed in an air traffic display. However, in alternative embodiments, only position or identification information may be obtained and displayed. Thus, for example, identification information may be obtained using the techniques of the present invention for use in identifying aircraft in the vicinity. Position information of such aircraft may not be required, or may be obtained using other techniques, including, but not limited to, conventional radar.

We claim:

1. A method of tracking aircraft, comprising the steps of:
detecting, using an ACARS signal, whether an aircraft is arriving or departing, and determining aircraft intent,
determining, using an aircraft surveillance system, physical position of an aircraft,
fusing ACARS data with aircraft surveillance data to provide a combined data stream,
transmitting the combined data stream to at least one user, and
displaying position of the aircraft to the at least one user along with the aircraft intent.

2. The method of claim 1, wherein said aircraft surveillance system comprises at least one of a multilateration system and a radar system.

3. The method of claim 2, wherein said step of displaying position of the aircraft to the at least one user along with the aircraft intent comprises the step of displaying position of the aircraft and aircraft intent on an in-cockpit display.

4. A system for tracking aircraft, comprising:
means for detecting from using an ACARS signal, whether an aircraft is arriving or departing to determine aircraft intent;
an aircraft surveillance system for determining physical position of an aircraft;
means for fusing ACARS data with aircraft surveillance data to provide a combined data stream;
means for transmitting the combined data stream to at least one user; and
means for displaying position of the aircraft to the at least one user along with the aircraft intent.

5. The system of claim 4, wherein said aircraft surveillance system comprises at least one of a multilateration system and a radar system.

6. The system of claim 5, wherein said means for displaying position of the aircraft to the at least one user along with the aircraft intent comprises an in-cockpit display.

* * * * *